Feb. 28, 1933.         A. M. GRAY         1,899,414
BERMUDA GRASS CUTTER
Filed Dec. 24, 1931
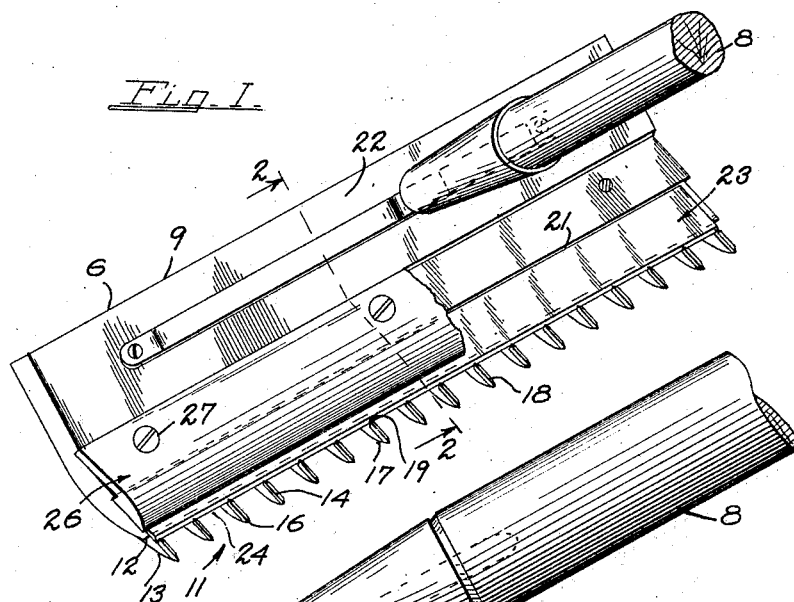
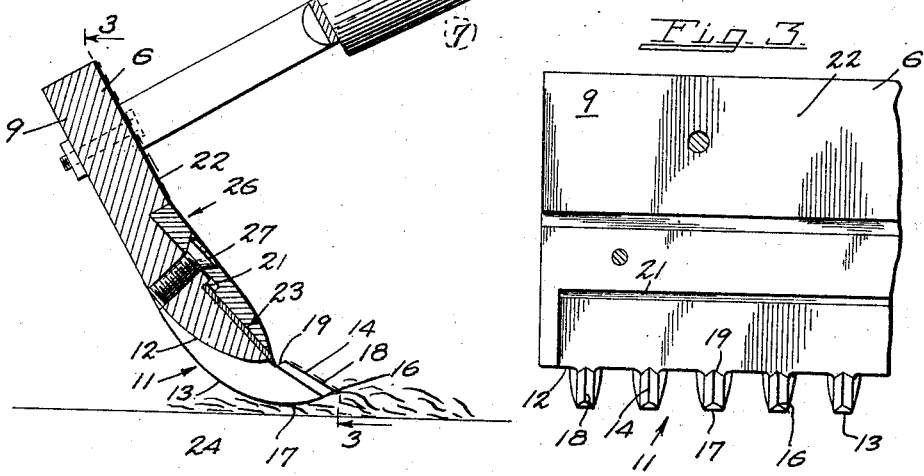
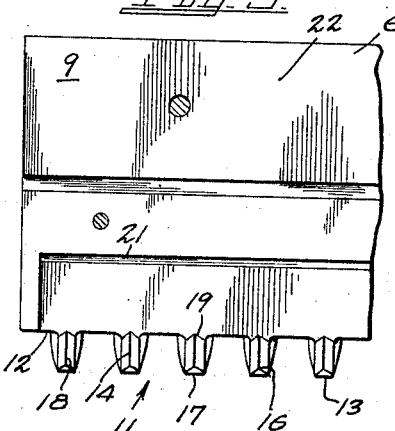
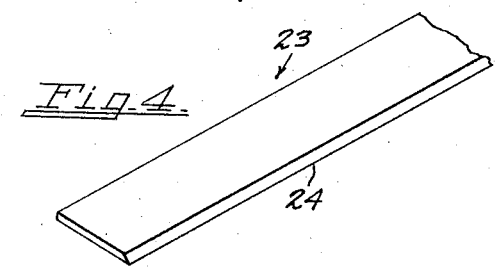
Inventor
A. M. Gray
By Hazard and Miller
Attorneys.

Patented Feb. 28, 1933

1,899,414

UNITED STATES PATENT OFFICE

ARCHIE M. GRAY, OF COMPTON, CALIFORNIA

BERMUDA GRASS CUTTER

Application filed December 24, 1931. Serial No. 583,022.

This invention relates to garden tools, and more especially to a weed cutter of improved form.

An object of the invention is to provide a weed cutting tool, which, while being adapted for use in killing a wide variety of weeds, is particularly adapted for killing Bermuda grass.

Another object of the invention is the provision of a Bermuda grass cutter which is adapted to operate efficiently in killing Bermuda grass, without harming other types of grass immediately adjacent the grass which is to be killed.

A more detailed object is to provide a Bermuda grass cutter in the form of a rake having a plurality of tines adapted to ride upon curved edges instead of upon points, thereby preventing the tines from digging into the soil. These curved tines are adapted to lift the runners of Bermuda grass and similar weeds, and carry them into contact with a blade suitably positioned to cut the runners without harming other types of grass immediately adjacent the Bermuda grass which is to be killed.

The invention possesses other objects and advantageous features, some of which, with those enumerated, will be set forth in the following description of the invention's particular embodiment which is illustrated in the drawing accompanying and forming a part of the specification.

Referring to the drawing:

Fig. 1 is a perspective view of a Bermuda grass cutter embodying the principles of the present invention, a portion of the handle being broken away to reduce the length of the figure.

Fig. 2 is a transverse vertical sectional view taken substantially upon the line 2—2 of Fig. 1, with the direction of view as indicated.

Fig. 3 is a compound sectional view taken substantially upon the line 3—3 of Fig. 2, with the direction of view as indicated. A portion of the figure is broken away to reduce its length.

Fig. 4 is a perspective view of the blade which forms a portion of the tool of the present invention. A portion of the figure is broken away to reduce its length.

A preferred embodiment of my improved Bermuda grass cutter is illustrated in the drawing, and comprises a head 6 provided with a suitable tang 7 rigid therewith, whereby an operating handle 8 may be rigidly connected to the head 6. The head 6 comprises a bar 9, preferably of metal, extending transversely with respect to the handle 8, and a plurality of tines 11 extending downwards from the lower edge 12 of the transverse bar 9.

The particular configuration of the tines 11 is of importance. The after edge 13 of each tine 11, as it extends downwards from the lower edge 12 of the bar 9, curves forwards to intersect the forward edge 14 substantially in a point 16. The curvature of the edges 13 of the tines 11 is such that when the tool is held in operative position, preferably with the handle 8 extending upwards from the bar 9 at substantially 30° from the horizontal, the points 16 are elevated slightly above the surface upon which the tool rests. Hence the tool makes contact with the ground when the tool is in use, only at the lowermost portions 17 of the curved edges 13 of the tines. The after edges 13 are of material width, so that the portions 17 thereof which make contact with the ground, are flat, as best shown upon Fig. 3.

The forward edges 14 of the tines incline upwards from the points 16 toward the bar 9, and each forward edge is sharpened, as indicated at 18, and terminates at a shoulder 19 adjacent the lower edge 12 of the bar 9. The shoulders 19 of all the tines 13 are in alinement, and a preferably continuous shoulder 21 is provided upon the forward face 22 of the bar 9, parallel to the row of shoulders 19 and a suitable distance thereabove to accommodate a blade 23 therebetween.

The blade 23 is provided with a cutting edge 24 disposed adjacent the intersection of the forward edges 14 of the tines 13 with the lower edge 12 of the bar 9. A clamping plate 26 releasably secured to the forward face 22 of the bar, as by a plurality of screws 27, presses against the blade 23 to retain the blade in operative position between the shoulders 21 and the row of shoulders 19, as clearly illustrated upon Fig. 2.

Preferably the blade 23 corresponds in width to the conventional safety razor blade, so that a row of such blades may be employed, instead of a continuous single blade such as that which is illustrated upon Fig. 4.

When the tool is in use, with the handle 8 extending upwards from the head 6 at substantially 30° from the horizontal, the tool will engage the ground with only the longitudinally curved and transversely flat portions 17 of the tines resting upon the surface thereof. Hence these curved surfaces act as runners, holding the points 16 of the tines elevated above the surface of the ground and preventing their penetrating the ground. Accordingly, the surface of the ground is not scored or otherwise disturbed, one of the results of which is to permit drawing the tool across the surface of the ground with the utmost ease.

The points 16 are elevated above the surface of the ground to such a slight extent that they are adapted to engage and lift runners such as those which characterize the growth of Bermuda grass. These runners extend along the surface of the ground instead of rising vertically therefrom similarly to the blades of other types of grass. Hence the points 16 are enabled to engage the runners and lift them so that they slide upwards on the sharpened forward edges 18 of the tines 13. If the runners are not cut by the edges 18 they will be carried upwards into engagement with the cutting edge 24 of the blade 23, which preferably is considerably sharper than the edges 14. One of the characteristics of the runners of Bermuda grass is that they send out roots which fasten the runners securely to the ground at intervals. Hence portions of the runners are held down with sufficient force so that those portions of the runners which are elevated by the tines 13 will be severed either by the edges 14 or the cutting edge 24 of the blade 23. Inasmuch as Bermuda grass multiplies through the expedient of these runners, the tool of the present invention makes it possible to prevent the spread of Bermuda grass without harming other types of grass with which the Bermuda grass is mixed, and if the tool is used frequently so as to check the growth of runners, the Bermuda grass may ultimately be killed off.

It is to be understood that the details of the invention as herein disclosed, are subject to alteration within the spirit or scope of the appended claim.

I claim:

In a garden tool, a handle, a head rigid therewith and comprising a transversely extending bar and a plurality of tines extending downwards from said bar, said tines having alined shoulders on their forward edges and said bar having a shoulder parallel to the shoulders of said tines, a blade disposed between said shoulders, a removable clamping plate holding said blade in place, the after edges of said tines being curved forwards and intersecting the forward edges thereof, said forward edges inclining upwards toward said blade and said tines riding upon said curved after edges with the points of intersection of their forward and after edges elevated above the ground when said tool is in operative position.

In testimony whereof I have signed my name to this specification.

ARCHIE M. GRAY.